Nov. 3, 1959   C. GREENFIELD   2,911,423
RECOVERY OF STEARIC AND OLEIC ACIDS
Filed Oct. 1, 1957
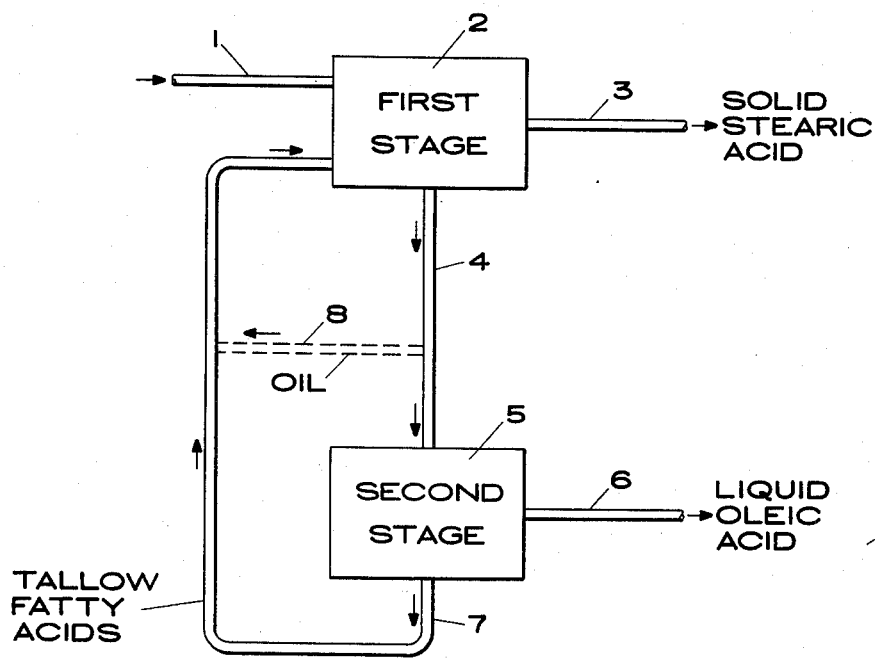

United States Patent Office 2,911,423
Patented Nov. 3, 1959

2,911,423

RECOVERY OF STEARIC AND OLEIC ACIDS

Charles Greenfield, Elizabeth, N.J.

Application October 1, 1957, Serial No. 687,516

4 Claims. (Cl. 260—419)

This invention relates to an improved process for separating and recovering stearic and oleic acids. More particularly it relates to a process wherein these acids are recovered from liquid mixtures containing them by staged cooling and pressing under pressure.

The use of fractional crystallization in the manufacture of trade stearic and oleic acids is known. In such processes molten tallow fatty acids are run into small aluminum pans. The filled pans are cooled in a cold room to an ultimate temperature of 40° to 45° F., about 12 to 20 hours being allowed for the operation. Then the solidified acids are removed from the pans in the form of cakes which are pressed in hydraulic presses under pressures of from 150 to 250 pounds per square inch. The expressed liquid is commercial oleic acid and has a titer (solidifying point) of approximately 10° C. This product is further chilled and filtered to produce an oil having a titer of 0° to 5° C. The cakes from the cold pressing operation are melted, recast at room temperature and pressed one or more times in steam-heated hot presses. A single hot pressing yields so-called "single pressed" stearic acid; two pressings a "double pressed" grade of stearic acid; and three pressings a "triple pressed" or highest grade of stearic acid, which has an iodine value of 3–4, and a titer of 130.5° F. to 131.5° F. The liquid material from each pressing, as well as the soft edges of the cake, are recycled to the original feedstock. That process is characterized by high material handling and refrigeration costs. It is therefore desirable to provide a more efficient operation.

This invention provides an improved staged process for separating and recovering stearic and oleic acids which overcomes the beforementioned difficulties. The process comprises briefly, cooling a warm, liquid mixture containing these acids to a temperature in the range of 75° to 100° F., preferably 85° to 95° F., pressing the cooled mixture at a pressure in the range of 250 to 4000 p.s.i., preferably 1500 to 3000 p.s.i., to separate as crystals stearic acid from the residual liquid and further cooling the residual liquid in a second stage to separate as a liquid trade oleic acid from the resulting crystals. The tallow fatty acid crystals from the oleic acid separation are reheated and can be recycled as a liquid to the stearic acid separation stage.

In the second stage the lower the temperature the purer the oleic acid obtained as long as the crystallization point of the oleic acid itself is avoided. Conveniently the conditions will thus be a cooling temperature in the range of 30° F. to 60° F. and preferably 32° F. to 45° F. The resultant crystals are separated from the oleic acid liquid by pressing, centrifuging, filtering, etc.

This invention will be better understood by reference to an example and block flow diagram shown in the drawing.

Referring now to the diagram, 100 initial parts of tallow fatty acids, after splitting of inedible tallow, containing 40 parts of stearic acid and 60 parts of oleic acid by weight, are fed as a liquid mixture at a temperature of 100° F through line 1 into first crystallization stage 2. The mixture is cooled of 92° F. at which point stearic acid, e.g. 25 parts, crystallizes out. The mixture is pressed at a pressure of 2000 p.s.i. in equipment such as the Carver filter press and solid stearic acid is removed through line 3. The residual liquid is passed through line 4 to second crystallization stage 5. This residual liquid is further cooled to a temperature of, e.g. 35° F., preferably by technique shown in U.S. Patent 2,619,421, and then pressed at a pressure of 100 p.s.i. Oleic acid, e.g. 37.5 parts, is withdrawn as a liquid through line 6. The resulting crystals which amount to another 37.5 parts are recycled after melting at 110° F. through line 7 to first stage crystallizer 2. Alternatively some of the first stage filtrate can bypass the second stage crystallizer 5 through lines 8 and 7.

Crystallizing of e.g. 25% to 30% of the material in each stage results in a system having satisfactory fluidity. The recycle is thus controlled to give this type operation.

The stearic acid obtained is of at least "double pressed" grade and control of pressures and time intervals gives "triple pressed" quality. The oleic acid obtained is a 0–2° C. titer oil or a very high grade. Even lower titers can be obtained by slightly lowering the temperature in the second stage.

The advantages of the method of recovery of this invention is the considerable amount of manual labor saved because of the elimination of the need of hand wrapping and handling of small quantities of material. The need for solvent systems with their expensive recovery equipment and high steam requirements are also avoided. In addition by this technique refrigeration requirements are reduced sharply because the major portion of stearic acid is crystallized out at elevated temperatures where cooling water normally available is the requirement, compared to electrical refrigeration load required for the pan process.

This process can be applied to a mixture of soya acids, and cottonseed acids, with some modifications of the pressures exerted. It can also be applied to mixtures of greater variability than can be handled in conventional processes. Thus extraneous components can be added to the systems being treated so as to obtain modified solid products of various titers as may be desired.

It is to be understood that this invention is not limited to the specific examples which have been offered merely as illustrations and that modifications may be made without departing from the spirit of the invention.

What is claimed is:

1. A process for separating and recovering stearic and oleic acids from a warm, liquid mixture containing them which comprises the steps of cooling the mixture to a temperature in the range of 75° to 100° F.; pressing the cooled mixture at a pressure in the range of 250 to 4000 p.s.i. to separate as crystals stearic acid from the residual liquid and further cooling the residual liquid to separate liquid oleic acid from the resulting crystals.

2. The process of claim 1 in which the second cooling step is conducted at a temperature in the range of 30° to 60° F.

3. The process of claim 2 including the additional step of heating the resulting crystals from the oleic acid separation step to melt them and recycling this resulting liquid to the first cooling step.

4. The process of claim 2 including the additional step of recycling the residual liquid from the pressing step to the first cooling step.

References Cited in the file of this patent

UNITED STATES PATENTS

| | | |
|---|---|---|
| 2,293,676 | Myers et al. | Aug. 18, 1942 |
| 2,543,055 | Pool et al. | Feb. 27, 1951 |
| 2,576,841 | Leaders et al. | Nov. 27, 1951 |

UNITED STATES PATENT OFFICE
CERTIFICATE OF CORRECTION

Patent No. 2,911,423                                                        November 3, 1959

Charles Greenfield

It is hereby certified that error appears in the printed specification of the above numbered patent requiring correction and that the said Letters Patent should read as corrected below.

Column 1, line 71, for "100° F" read -- 110° F. --; line 72, for "cooled of" read -- cooled to --.

Signed and sealed this 24th day of May 1960.

(SEAL)
Attest:

CARL H. AXLINE
Attesting Officer

ROBERT C. WATSON
Commissioner of Patents